| United States Patent [19] | [11] Patent Number: 4,804,697 |
| Saito et al. | [45] Date of Patent: Feb. 14, 1989 |

[54] THERMOPLASTIC RESIN COMPOSITION HAVING AN IMPROVED CHEMICAL RESISTANCE

[75] Inventors: Teruo Saito, Kusatsu; Kuniaki Asai, Tondabayashi; Yasurou Suzuki, Takatsuki, all of Japan

[73] Assignee: Sumitomo Chemical Company, Limited, Osaka, Japan

[21] Appl. No.: 166,455

[22] Filed: Mar. 10, 1988

Related U.S. Application Data

[63] Continuation-in-part of Ser. No. 932,206, Nov. 18, 1986.

[30] Foreign Application Priority Data

Nov. 29, 1985 [JP]  Japan .................................. 60-270431

[51] Int. Cl.$^4$ ........................... C08K 7/14; C08K 7/04; C08K 3/34; C08K 3/20
[52] U.S. Cl. ..................................... 524/80; 524/413; 524/449; 524/451; 524/456; 524/494; 524/496; 524/540; 524/542
[58] Field of Search ................ 524/540, 542, 80, 413, 524/449, 451, 456, 494, 496; 525/471

[56] References Cited

U.S. PATENT DOCUMENTS 4,624,997  11/1986  Robeson et al. .

FOREIGN PATENT DOCUMENTS 58-34512    3/1983  Japan .
59-202256  11/1984  Japan .
61-106666   5/1986  Japan .
61-118458   6/1986  Japan .

OTHER PUBLICATIONS

Titow et al., "Reinforced Thermoplastics", pp. 82-83, John Wiley & Sons (1975).
Katz et al., "Handbook of Fillers and Reinforcements for Plastics", p. 488 Van Nostrand Reinhold Co. (1978).

*Primary Examiner*—Lewis T. Jacobs
*Attorney, Agent, or Firm*—Stevens, Davis, Miller & Mosher

[57] ABSTRACT

A thermoplastic resin composition comprising a resin blend comprising an aromatic polysulfone and a polyetherketone, the relationship between the blending ratio and the melt viscosity of said polyetherketone satisfying a specific mathematical expression, and one or more inorganic fillers having a specific shape is disclosed. The thermoplastic resin composition according to the present invention provides many property advantages including chemical resistance and injection molding stability. It can be suitably used in the frontier industries such as electric, electronic, automobile and office automation instrument industries.

8 Claims, 1 Drawing Sheet

F I G. 1
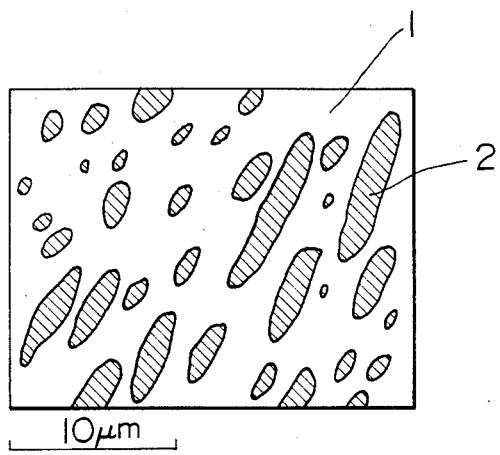
F I G. 2
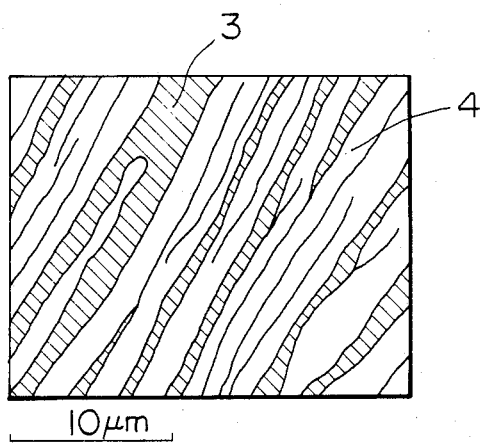

THERMOPLASTIC RESIN COMPOSITION HAVING AN IMPROVED CHEMICAL RESISTANCE

CROSS-REFERENCE TO RELATED APPLICATIONS

This is a continuation-in-part of application Ser. No. 932,206, filed on Nov. 18, 1986.

The present invention relates to a thermoplastic resin composition having an improved chemical resistance comprising a resin blend comprising an aromatic polysulfone and a polyetherketone and one or more fillers.

Polyetherketones are crystalline resins having a glass transition temperature of about 140–150° C. and a melting point of about 330–340° C. They offer many property advantages including high resistance to heat, chemicals, hydrolysis and radiation and flame retardancy and are noted by the wide range of their use in airplane, atomic energy, hot water, electric, electronic and auto industries. However, they have some disadvantages such as high processing temperature, sharp reduction of modulus of elasticity above the glass transition temperature and large creep under a heavy load.

Japanese Patent Application Kokai (Laid-Open) Nos. 58-34,512 and 59-202,256 and U.S. Pat. No. 4,624,997 disclose that the above problems are improved when an aromatic polysulfone is blended in a polyetherketone.

According to Japanese Patent Application Kokai (Laid-Open) No. 58-34,512, a composition comprising a polyetherketone and an aromatic polysulfone in a ratio of from 60:40–40:60 is suitably used for electric wires because of the good extrusion moldability and heat resistance thereof. It also discloses that if the aromatic polysulfone is blended too little, the extrusion moldability becomes inferior and if it is blended too much on the contrary, the heat resistance thereof becomes inferior.

Japanese Patent Application Kokai (Laid-Open) No. 59-202,256 discloses a composition comprising 2–98% by weight of a polyetherketone and 98–2% by weight of an aromatic polysulfone, and U.S. Pat. No. 4,624,997 discloses an article moled from a blend of 5–95% by weight of a crystalline poly(aryl ether ketone) and 95–5% by weight of an amorphous poly(aryl ether sulfone).

However, the chemical resistance of the above compositions, which is one of the characteristic features of polyetherketones, becomes reduced with the increase of the amount of aromatic polysulfone blended. This fact and the measure for solving this problem are utterly disregarded in the above related art references.

On the other hand, requirements for resin materials have been enhanced and diversified in recent years, particularly in frontier industries such as electric, electronic, automobile and office automation instrument industries. So that there has been strong demands for a resin having an improved chemical resistance along with the merits of a resin composition comprising a polyetherketone and an aromatic polysulfone.

Therefore, the object of the present invention is to provide a thermoplastic resin composition comprising a polyetherketone and an aromatic polysulfone and having an improved chemical resistance and an injection molding stability.

In recognition of the above situation, the present inventors have made extensive studies to find that the object of the present invention is attained by a thermoplastic resin composition comprising a resin blend comprising an aromatic polysulfone having a specific structure and a polyetherketone having a specific structure, the relationship between the blending ratio and the melt viscosity of said polyetherketone satisfying a specific mathematical expression, and one or more filler having a specific shape.

Thus, according to the present invention, there is provided a thermoplastic resin composition having an improved chemical resistance comprising (A) 100 parts by weight of a resin blend comprising 60–5% by weight of an aromatic polysulfone having the following repeating unit;

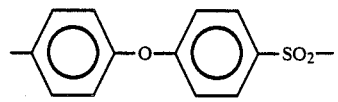

and 40–95% by weight of a polyetherketone having the following repeating unit;

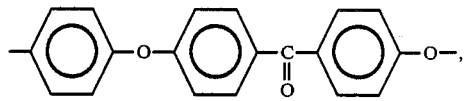

the melt viscosity of said polyetherketone at 400° C. satisfying the following inequality;

$$200 \leq y \leq 80x - 700,$$

wherein x represents the percentage by weight of said polyetherketone relative to the total amount of said polyetherketone and aromatic polysulfone and the unit of y is poise, and (B) 10–200 parts by weight of one or more fillers selected from the group consisting of inorganic fibers having an average length of 5 $\mu$m or more, inorganic needle-shaped materials having an average length of 5 $\mu$m or more and inorganic substances having an average diameter of 5 $\mu$m or more.

In the present invention, the melt viscosity of resin is defined as the apparent melt viscosity determined by filling the resin in a cylinder having a cross-sectional area of 1 cm$^2$, allowing it to stand at 400° C. for 5 minutes, and extruding it through a nozzle having a diameter of 1 mm and a length of 10 mm under an extrusion pressure of 50 kgf/cm$^2$ (in other words, extruding it at a shear stress of 1.25 kgf/cm$^2$).

FIGS. 1 and 2 show schematized morphologies observed by a scanning electron microscope of section of samples obtained by cutting the tensile test specimens in Comparative Examples 4 and 6 along the molding flow direction followed by etching their sections with N-methyl-2-pyrrolidone, which is a solvent for aromatic polysulfones. In the Figures, 1 represents the polyetherketone phase, 2 the aromatic polysulfone phase etched, 3 the void left behind after the aromatic polysulfone is etched away and 4 the polyetherketone phase changed into a fibrous form.

In the present invention, usable polyetherketones are known ones having the following repeating unit;

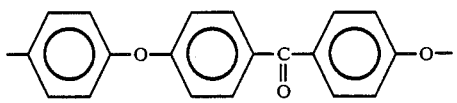

A typical example of such polyetherketones is VICTREX® PEEK, which is commercially available from ICI Ltd.

The melt viscosity y (unit: poise) of the polyetherketone used in the present invention must satisfy the following inequality;

$$200 \leq y \leq 80x - 700 \quad \ldots \quad (1)$$

preferably, $$500 \leq y \leq 80x - 700 \quad \ldots \quad (2)$$

wherein x represents the weight percentage of the polyetherketone relative to the total amount of the polyetherketone and aromatic polysulfone.

When the melt viscosity of the polyetherketone at 400° C. is less than 200 poises, the resulting thermoplastic resin composition has too high fluidity owing to its low molecular weight and accordingly it causes unstable molding and insufficient retention of applied secondary pressure in injection molding (the most common method of molding) and as the results, it tends to give molded articles with sink and poor dimensional accuracy.

On the other hand, when the melt viscosity y (poise) of the polyetherketone at 400° C. falls in the range defined by the following inequality;

$$y > 80x - 700 \quad (3)$$

the solvent resistance of the resulting thermoplastic resin composition is not sufficient.

In the present invention, usable aromatic polysulfones are known ones having the following repeating unit:

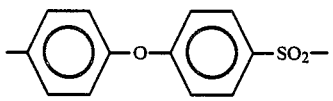

A typical example of such aromatic polysulfones is VICTREX®PES, which is commercially available from ICI LTD.

When the aromatic polysulfone has a melt viscosity of 1,000 poises of more as determined at 400° C. under a shear stress of 1.25 kfg/cm², the resulting thermoplastic resin composition is further improved in such physical properties as strength and toughness and also in chemical resistance.

When the melt viscosity is 3,000 poises or more, the resulting thermoplastic resin composition shows a still more marked improvement in chemical resistance.

40–95% by weight of the polyetherketone and 60–5% by weight of the aromatic polysulfone are blended in the resin blend used in the present invention.

When the proportion of the aromatic polysulfone is less than 5% by weight and that of the polyetherketone is more than 95% by weight, the modules of elasticity of the resulting thermoplastic resin composition is greatly reduced at a temperature equal to or higher than the glass transition temperature of the polyetherketone. In addition, the thermoplastic resin composition has a poor creep resistance at a temperature equal to or higher than the glass transistion temperature of the polyetherketone like the polyetherketone alone, and thus the defect of the polyetherketone is not obviated.

On the other hand, when the proportion of the polyetherketone is less than 40% by weight and that of the aromatic polysulfone exceeds 60% by weight, the resulting thermoplastic resin composition shows markedly reduced resistance to chemicals and to hot water irrespective of the molecular weight of the polyetherketone used.

In order to further improve the above properties, the resin blend preferably contains 50–90% by weight of the polyetherketone and 50–10% by weight of the aromatic polysulfone, more preferably 50–80% by weight of the polyetherketone and 50–20% by weight of the aromatic polysulfone.

Next, the fillers used in this invention is described in detail below.

In the present invention, usable fillers are one or more fillers selected from the group consisting of inorganic fibers having an average length of 5 μm or more, inorganic needle-shaped materials having an average length of 5 μm or more and inorganic substances having an average diameter of 5 μm or more. The inorganic substances include tabular, lump and globular fillers.

The term "average length" or "average diameter" used herein refers to a weight average value, and, for the tabular or lump fillers, the average diameter indicates the weight average value of the longest diameter.

Specific examples of the inorganic fibers, inorganic needle-shaped materials and inorganic substances are glass fibers, carbon fibers, boron fibers, alumina fibers and the like; calcium metasilicate, potassium titanate whiskers and the like; mica, glass flakes, talc and the like, respectively. At least one of these fillers is compounded in the resin composition.

Any of inorganic fibers having an average length of less than 5 μm, inorganic needle-shaped materials having an average length of less than 5 μm, inorganic substances having an average diameter of less than 5 μm or the combination thereof do not exhibit a satisfactory effect in improving the chemical resistance of the resin composition.

By contrast, the use of inorganic fillers having an average length of 10 μm or more, inorganic needle-shaped materials having an average length of 10 μm or more, inorganic substances having an average diameter of 10 μm or more or the combination thereof are preferred because they give a large improving effect on the chemical resistance of the resin composition.

The amount of fillers to be compounded is 10 to 200 parts by weight, preferably, 15 to 100 parts by weight, more preferably, 50 to 100 parts by weight, relative to 100 parts by weight of the resin blend comprising 40 to 95% by weight of the polyetherketone and 60 to 5% by weight of the aromatic polysulfone.

When the amount of fillers compounded is less than 10 parts by weight of the resin blend, the chemical resistance of the thermoplastic resin composition is scarcely improved. When the compounded amount exceeds 200 parts by weight, the resulting resin composition has a markedly reduced melt fluidity and exhibits a poor behavior in granulation and injection molding.

The compounding method used to obtain the thermoplastic resin composition of this invention is not critical.

The composition may be obtained either by supplying each of the polyetherketone, aromatic polysulfone and fillers separately to a melt-blender or by preliminarily mixing these materials beforehand by use of a mortar, Henschel mixer, ball mill or ribbon blender and then supplying the resulting mixture to a melt blender.

Further, the powder, granule or pellet of the polyetherketone, the powder, granule or pellet of the aromatic polysulfone, and the fillers may be dry-blended and then directly supplied to an injection machine.

Further, the thermoplastic resin composition of the present invention may be incorporated with one or more conventional additives including antioxidants, thermal stabilizers, ultraviolet absorbers, release agents, coloring agents and nucleating agents within a range not detrimental to the object of this invention.

The thermoplastic resin composition of the present invention has an excellent source resistance by virtue of the addition of the specified fillers in addition to the superiority in modules and in creep resistance at an elevated temperature and in resistance to stress cracking, all of which are characteristic features of a composition comprising a polyetherketone and an aromatic polysulfone.

It is supposed to be caused through the following mechanism.

Polyetherketones and aromatic polysulfones are incompatible and accordingly, the blend thereof has any one of the following three morphologies depending on the content and melt viscosity of the polyetherketone:

(1) an islands-in-a-sea structure, wherein the polyetherketone forms a continuous phase and the aromatic polysulfone forms a dispersed phase having a diameter of several to 10 μm (2) a structure wherein the polyetherketone forms itself into fibers and the aromatic polysulfone forms a continuous phase (3) an islands-in-a-sea structure wherein the aromatic polysulfone forms a continuous phase and the polyetherketone forms an island phase.

FIGS. 1 and 2 show schematized morphologies observed by a scanning electron microscope of section of samples obtained by cutting the tensile test specimens in Comparative Examples 4 and 6 along the molding flow direction followed by etching their sections with N-methyl-2-pyrrolidone, which is a solvent for aromatic polysulfones. In the FIGS., 1 represents the polyetherketone phase, 2 the aromatic polysulfone phase etched, 3 the void left behind after the aromatic polysulfone is etched away and 4 the polyetherketone phase changed into a fibrous form.

Naturally, the similar phenomenon occurs in the case of the resin blend used in the present invention. In the case where the polyetherketone having the following repeating unit;

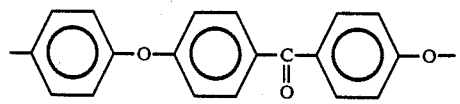

and the aromatic polysulfone having the following repeating unit;

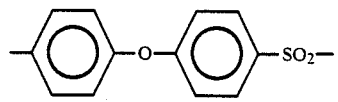

are blended, the resin blend has the so-called islands-in-a-sea structure as shown in FIG. 1 when the blend contains 40% by weight or more of the polyetherketone and the relationship between the content and melt viscosity of the polyetherketone satisfies the above-mentioned mathematical expression. The chemical resistance of such a blend is hardly reduced.

On the other hand, when the blend contains less than 40% by weight of the polyetherketone or the relationship between the content and melt viscosity of the polyetherketone is unsatisfied, the blend has a structure wherein the polyetherketone forms fibers and the aromatic polysulfone forms a continuous phase as shown in FIG. 2 or a structure wherein the aromatic polysulfone forms a continuous phase and the polyetherketone forms an insland phase. When these blends are dipped into a good solvent for aromatic polysulfones (e.g. N-methyl-2-pyrrolidone, N,N-dimethylformamide etc.), they swell or the aromatic polysulfone portions are dissolved in the solvent and as the results, their strength is greatly reduced.

In addition, by adding one or more fillers defined above to the resin blend, the chemical resistance of the resulting thermoplastic resin composition is highly improved compared with those without fillers because said filler or fillers play the role of dividing the island phase of the aromatic polysulfone so as to protect the solvent permeation. The above mechanism is supported by the following examples (see data of weight increase ratio and tensile strength retention after the immersion in N-methyl-2-pyrrolidone for 168 hours).

U.S. Pat. No. 4,624,997 discloses in its examples 8 and 15 articles molded from 50/50 blend of the polyetherketone and aromatic polysulfone having the same repeating units as used in the examples of the present invention, but it is quite silent about the chemical resistance thereof and how to improve it. In addition, it can be seen that said polyetherketone has a reduced viscosity of 1.2 dl/g (about 4,500 poises when converted to a melt viscosity at 400° C.) and does not satisfy the mathematical expression of the present invention and that said aromatic polysulfone has the similar reduced viscosity as used in the examples of the present invention. Therefore, these blends disclosed in U.S. Pat. No. 4,624,997 practically correspond to the resin composition of the following Comparative Examples 6 and 7 of the present invention. As seen later, the resin composition of Comparative Examples 6 and 7 are inferior in chemical resistance.

Moreover, the resin composition containing 100 parts by weight of the same resin blend as in U.S. Pat. No. 4,624,997 and 50 parts by weight of the same glass fiber as used in the present invention is considered to have a chemical resistance value falling between the values in the following Comparative Examples 1 and 2. As seen later, both of the compositions in Comparative Examples 1 and 2 are inferior in chemical resistance.

Thus, the present invention, based on the finding that the chemical resistance of the polyetherketone/aromatic polysulfone resin composition greatly depends on its morphology, provides a measure for solving the problem of chemical resistance reduction.

The following Examples and Comparative Examples serve to give specific illustrations of the practice of the present invention but not intended to limit the scope thereof.

EXAMPLES 1 TO 15, AND COMPARATIVE EXAMPLES 1 TO 34

In the following Examples and Comparative Examples, there were used polyetherketones having the following repeating unit;

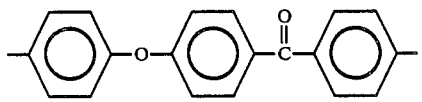

having a melt viscosity at 400° C. of 1,000, 3,500 or 5,600 poises (an intrinsic viscosity of 0.9, 1.10 or 1.31 as measured in concentrated sulfuric acid at 25° C., respectively).

There was used an aromatic polysulfone having the following repeating unit;

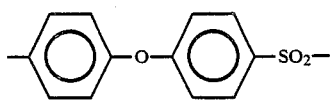

having a melt viscosity at 400° C. of 4,500 poises (a reduced viscosity of 0.52 dl/g as measured in N-methylpyrrolidone at 25° C.).

The filler used were a glass fiber (CSO3 MAPX-1, a trade name, mfd. by Asahi Fiber Glass Co., Ltd.), a carbon fiber (Magnamite®1810, mdf. by Hercules Inc.), a potassium titanate fiber (Tismo®D, mfd. by Otsuka Chemical Co., Ltd.), calcium metasilicate (NYAD®-G, mfd. by NYCO Co.), mica (Suzorite® Mica 200S, mfd. by Kuraray Co., Ltd.), talc (S Talc, a trade name, mfd. by Shokosan Kogyosho Co., Ltd.), talc (Micron White®5000S, mfd. by Hayashi Kasei Co., Ltd.), titanium oxide (Tipaque®CR-60, mfd. by Ishihara Sangyo Kaisha, Ltd.) and alumina (mfd. by Sumitomo Aluminum Smelting Co., Ltd.).

These ingredients were compounded in proportions shown in Tables 1, 2 and 3 and melt-blended at 360° C. in a twin screw extruder (PCM-30, a trade name, mfd. by Ikegai Iron Works, Ltd.). Thereafter, the extruded strands were cooled with water and cut into pellets.

The pellets obtained above were molded into tensile test specimens by use of an injection molding machine (Nestal 47/28 Injection-molding machine mfd. by Sumitomo Heavy Industries Co., Ltd.; cylinder temperature: 380° C., injection pressure: 1500 kg/cm$^2$, injection speed: medium speed, injection time: 10 sec, cooling time: 20 sec, mold temperature: 150° C.), and the specimens were subjected to the determination of tensile strength according to ASTM D-638.

Solvent resistance was tested by immersing the above-mentioned tensile test specimen in N-methyl-2-pyrrolidone, which is a good solvent for aromatic polysulfones, for 24 hours, measuring the change in weight, then immersing the specimen again and after total immersion time of 168 hours, measuring the change in weight and tensile strength.

The weight average dimension of the fillers was determined by a scanning electron microscope observation of a residue obtained by burning the tensile test specimen in a crucible or a residue obtained by dissolving the specimen in sulfuric acid.

The results are shown in Tables 1, 2 and 3.

TABLE 1

| | Composition (parts by weight) | | | | | Weight average length (μm) | Initial tensile strength (kg/cm$^2$) | Weight increase ratio by immersion in NMP*2 | | After 168 hours of immersion in NMP*2 | |
|---|---|---|---|---|---|---|---|---|---|---|---|
| | Polyetherketone | | | Aromatic poly-sulfone | Glass fiber | | | 24 hours (%) | 168 hours (%) | Tensile strength (kg/cm$^2$) | Retention of strength (%) |
| | 1,000*1 | 3,500*1 | 5,600*1 | | | | | | | | |
| Example 1 | 50 | — | — | 50 | 50 | 250 | 1,450 | 1 | 5 | 990 | 68 |
| Example 2 | 50 | — | — | 50 | 100 | 230 | 1,570 | 1 | 3 | 1,190 | 76 |
| Comparative Example 1 | — | 50 | — | 50 | 50 | 250 | 1,460 | 3 | 7 | 800 | 55 |
| Comparative Example 2 | — | — | 50 | 50 | 50 | 250 | 1,460 | 6 | 24 | 88 | 6 |
| Comparative Example 3 | — | — | 50 | 50 | 150 | 210 | 1,600 | 4 | 14 | 130 | 8 |
| Comparative Example 4 | 50 | — | — | 50 | — | — | 890 | 3 | 48 | ummeasurable*3 | — |
| Comparative Example 5 | 50 | — | — | 50 | 5 | 250 | 1,100 | 2 | 18 | 170 | 15 |
| Comparative Example 6 | — | 50 | — | 50 | — | — | 860 | 9 | unmeasurable*3 | unmeasurable*3 | — |
| Comparative Example 7 | — | — | 50 | 50 | — | — | 860 | 21 | unmeasurable*3 | unmeasurable*3 | — |
| Comparative Example 8 | 30 | — | — | 70 | 50 | 250 | 1,400 | 2 | 8 | 770 | 55 |
| Example 3 | 65 | — | — | 35 | 50 | 250 | 1,580 | 0 | 3 | 1,300 | 82 |
| Example 4 | — | 65 | — | 35 | 50 | 250 | 1,600 | 1 | 4 | 990 | 62 |
| Comparative Example 9 | — | — | 65 | 35 | 50 | 250 | 1,600 | 4 | 19 | 720 | 45 |
| Example 5 | — | — | 80 | 20 | 50 | 250 | 1,650 | 0 | 2 | 1,340 | 81 |
| Comparative Example 10 | — | — | 80 | 20 | — | — | 880 | 3 | 15 | 220 | 25 |

*1Melt viscosity at 400° C. (unit: poise)
*2NMP: N—methyl-2-pyrrolidone
*3Determination was impossible because of severe swelling or dissolution.

TABLE 2

| | Composition (parts by weight) | | | | | Weight average length (μm) | Initial tensile strength (kg/cm²) | Weight increase ratio by immersion in NMP*² | | After 168 hours of immersion in NMP*² | |
|---|---|---|---|---|---|---|---|---|---|---|---|
| | Polyetherketone | | | Aromatic poly-sulfone | Filler | | | 24 hours (%) | 168 hours (%) | Tensile strength (kg/cm²) | Retention of strength (%) |
| | 1,000*¹ | 3,500*¹ | 5,600*¹ | | | | | | | | |
| Example 6 | 50 | — | — | 50 | 50 Carbon fiber | 290 | 2,250 | 0 | 3 | 1,840 | 82 |
| Comparative Example 11 | — | 50 | — | 50 | 50 Carbon fiber | 290 | 2,200 | 2 | 5 | 1,450 | 66 |
| Comparative Example 12 | — | — | 50 | 50 | 50 Carbon fiber | 290 | 2,200 | 4 | 20 | 440 | 20 |
| Comparative Example 13 | 30 | — | — | 70 | 50 Carbon fiber | 290 | 2,100 | 2 | 6 | 1,260 | 60 |
| Example 7 | — | — | 80 | 20 | 50 Carbon fiber | 270 | 2,400 | 0 | 2 | 2,200 | 85 |
| Example 8 | 50 | — | — | 50 | 50 Potassium titanate whisker | 11 | 1,400 | 2 | 5 | 940 | 67 |
| Comparative Example 14 | — | 50 | — | 50 | 50 Potassium titanate whisker | 11 | 1,400 | 3 | 8 | 770 | 55 |
| Comparative Example 15 | — | — | 50 | 50 | 50 Potassium titanate whisker | 11 | 1,400 | 6 | 26 | 280 | 20 |
| Comparative Example 16 | 30 | — | — | 70 | 50 Potassium titanate whisker | 11 | 1,350 | 3 | 10 | 700 | 52 |
| Example 9 | — | — | 80 | 20 | 50 Potassium titanate whisker | 11 | 1,100 | 1 | 3 | 830 | 75 |
| Example 10 | 50 | — | — | 50 | 50 Calcium metasilicate | 28 | 880 | 2 | 6 | 630 | 72 |
| Comparative Example 17 | — | 50 | — | 50 | 50 Calcium metasilicate | 28 | 880 | 2 | 8 | 530 | 60 |
| Comparative Example 18 | — | — | 50 | 50 | 50 Calcium metasilicate | 28 | 880 | 5 | 25 | 220 | 25 |
| Comparative Example 19 | 30 | — | — | 70 | 50 Calcium metasilicate | 28 | 850 | 2 | 9 | 470 | 55 |
| Example 11 | — | — | 80 | 20 | 50 Calcium metasilicate | 28 | 930 | 1 | 3 | 720 | 77 |

*¹Melt viscosity at 400° C. (unit: poise)
*²NMP: N—methyl-2-pyrrolidone

TABLE 3

| | Composition (parts by weight) | | | | | Weight average diameter (μm) | Initial tensile strength (kg/cm²) | Weight increase ratio by immersion in NMP*² | | After 168 hours of immersion in NMP*² | |
|---|---|---|---|---|---|---|---|---|---|---|---|
| | Polyetherketone | | | Aromatic poly-sulfone | Filler | | | 24 hours (%) | 168 hours (%) | Tensile strength (kg/cm²) | Retention of strength (%) |
| | 1,000*¹ | 3,500*¹ | 5,600*¹ | | | | | | | | |
| Example 12 | 50 | — | — | 50 | 50 Mica | 42 | 960 | 0 | 3 | 810 | 84 |
| Comparative Example 20 | — | 50 | — | 50 | 50 Mica | 42 | 950 | 1 | 5 | 670 | 70 |
| Comparative Example 21 | — | — | 50 | 50 | 50 Mica | 42 | 950 | 4 | 20 | 830 | 35 |
| Comparative Example 22 | 30 | — | — | 70 | 50 Mica | 42 | 920 | 2 | 8 | 600 | 65 |
| Example 13 | — | — | 80 | 20 | 50 Mica | 42 | 1,000 | 0 | 1 | 860 | 86 |
| Example 14 | 50 | — | — | 50 | 50 Talc*⁴ | 7 | 880 | 0 | 5 | 640 | 73 |
| Comparative Example 23 | — | 50 | — | 50 | 50 Talc*⁴ | 7 | 850 | 1 | 7 | 510 | 60 |
| Comparative Example 24 | 30 | — | — | 70 | 50 Talc*⁴ | 7 | 830 | 2 | 11 | 410 | 50 |
| Example 15 | — | — | 80 | 20 | 15 Talc*⁴ | 7 | 860 | 2 | 7 | 620 | 72 |
| Comparative Example 25 | 50 | — | — | 50 | 50 Talc*⁵ | 2 | 870 | 2 | 9 | 460 | 53 |
| Comparative Example 26 | — | 50 | — | 50 | 50 Talc*⁵ | 2 | 850 | 3 | 12 | 340 | 40 |
| Comparative Example 27 | 30 | — | — | 70 | 50 Talc*⁵ | 2 | 830 | 4 | 18 | 170 | 20 |
| Comparative Example 28 | — | — | 80 | 20 | 15 Talc*⁵ | 2 | 860 | 3 | 15 | 300 | 35 |
| Comparative Example 29 | 30 | — | — | 70 | 50 Alumina | 2 | 840 | 4 | 20 | 210 | 25 |
| Comparative Example 30 | 50 | — | — | 50 | 50 Alumina | 2 | 840 | 4 | 16 | 290 | 35 |
| Comparative Example 31 | 50 | — | — | 50 | 150 Alumina | 2 | 820 | 3 | 12 | 330 | 40 |
| Comparative Example 32 | 30 | — | — | 70 | 50 Titanium oxide | <1 | 840 | 7 | Un-measur- | Un-measur- | — |

TABLE 3-continued

| | Composition (parts by weight) | | | | | Weight average diameter (μm) | Initial tensile strength (kg/cm²) | Weight increase ratio by immersion in NMP*2 | | After 168 hours of immersion in NMP*2 | |
|---|---|---|---|---|---|---|---|---|---|---|---|
| | Polyetherketone | | | Aromatic poly-sulfone | Filler | | | 24 hours (%) | 168 hours (%) | Tensile strength (kg/cm²) | Retention of strength (%) |
| | 1,000*1 | 3,500*1 | 5,600*1 | | | | | | | | |
| Comparative Example 33 | 50 | — | — | 50 | 50 Titanium oxide | <1 | 850 | 2 | able*3 40 | Un-measur-able*3 | — |
| Comparative Example 34 | 50 | — | — | 50 | 150 Titanium oxide | <1 | 710 | 2 | 32 | Un-measur-able*3 | — |

*1Melt viscosity at 400° C. (unit: poise)
*2NMP: N—methyl-2-pyrrolidone
*3Determination was impossible because of severe swelling or dissolution
*4S talc (trade name) mfd. by Shokosan Kogyosho Co., Ltd.
*5Micron White ® 5000S mfd. by Hayashi Kasei Co., Ltd.

What is claimed is:

1. A thermoplastic resin composition comprising (A) 100 parts by weight of a resin blend comprising 60-5% by weight of an aromatic polysulfone having the following repeating unit;

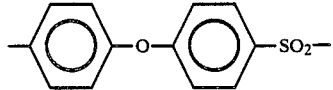

and 40-95% by weight of a polyetherketone having the following repeating unit;

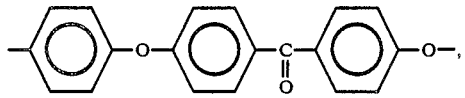

the melt viscosity of said polyetherketone at 400° C. satisfying the following inequality;

$$200 \leq y \leq 80x - 700,$$

wherein x represents the percentage by weight of said polyetherketone relative to the total amount of said polyetherketone and aromatic polysulfone and the unit of y is poise, and (B) 10-200 parts by weight of one or more fillers selected from the group consisting of inorganic fibers having an average length of 5 μm or more, inorganic needle-shaped materials having an average length of 5 μm or more and inorganic tabular, lump, or globular substances having an average diameter of 5 μm or more.

2. A temperature resin composition according to claim 1, wherein the aromatic polysulfone has a melt viscosity of 1,000 poises or more as measured at 400° C. under a shear stress of 1.25 kgf/cm².

3. A thermoplastic resin composition according to claim 1, wherein the aromatic polysulfone has a melt viscosity of 3,000 poises or more as measured at 400° C. under a shear stress of 1.25 kfg/cm².

4. A thermoplastic resin composition according to claim 1, wherein the blend comprises 50-90% by weight of the polyetherketone and 50-10% by weight of the aromatic polysulfone.

5. A thermoplastic resin composition according to claim 1, wherein the blend comprises 50-80% by weight of the polyetherketone and 50-20% by weight of the aromatic polysulfone.

6. A thermoplastic resin composition according to claim 1, wherein it comprises 15-100 parts by weight of the fillers.

7. A thermoplastic resin composition according to claim 1, wherein the fillers are one or more members selected from the group consisting of glass fibers, carbon fibers, boron fibers, alumina fibers, calcium metasilicate, potassium titanate whiskers, mica, glass flakes and talc.

8. A thermoplastic resin composition according to claim 1, wherein the fillers are one or more members selected from the group consisting of glass fibers, carbon fibers, calcium metasilicate, potassium titanate whiskers, mica and talc.

* * * * *